United States Patent
Larsson

(10) Patent No.: US 9,802,811 B2
(45) Date of Patent: *Oct. 31, 2017

(54) FLUID DISPENSING SYSTEM AND METHOD OF HEATING IN A FLUID DISPENSING SYSTEM

(71) Applicant: Wayne Fueling Systems Sweden AB, Malmo (SE)

(72) Inventor: Bengt I. Larsson, Skivarp (SE)

(73) Assignee: Wayne Fueling Systems Sweden AB, Malmö (SE)

( * ) Notice: Subject to any disclaimer, the term of this patent is extended or adjusted under 35 U.S.C. 154(b) by 3 days.

This patent is subject to a terminal disclaimer.

(21) Appl. No.: 14/847,484

(22) Filed: Sep. 8, 2015

(65) Prior Publication Data

US 2016/0060096 A1 Mar. 3, 2016

Related U.S. Application Data

(63) Continuation of application No. 14/706,710, filed on May 7, 2015, which is a continuation of application No. 13/508,364, filed as application No. PCT/EP2009/064814 on Nov. 9, 2009, now Pat. No. 9,038,856.

(51) Int. Cl.
| | |
|---|---|
| F16L 53/00 | (2006.01) |
| B67D 7/82 | (2010.01) |
| B67D 7/80 | (2010.01) |
| B67D 7/02 | (2010.01) |
| B67D 7/04 | (2010.01) |
| B67D 7/42 | (2010.01) |

(52) U.S. Cl.
CPC ................ *B67D 7/82* (2013.01); *B67D 7/02* (2013.01); *B67D 7/04* (2013.01); *B67D 7/42* (2013.01); *B67D 7/80* (2013.01); *F16L 53/008* (2013.01)

(58) Field of Classification Search
CPC ....... F16L 53/00; F16L 53/001; F16L 53/005; F16L 53/008; F16L 11/20; B67D 7/82; B67D 7/80; B67D 7/42; B67D 7/04; B67D 7/02; B67D 2210/00102
USPC .......................................... 138/33
See application file for complete search history.

(56) References Cited

U.S. PATENT DOCUMENTS

| | | | |
|---|---|---|---|
| 1,599,081 A | 9/1926 | Douglas | |
| 1,809,714 A * | 6/1931 | Mathews | F16L 53/008 219/522 |
| 2,644,820 A | 7/1953 | Greskam | |
| 3,275,803 A * | 9/1966 | True | H05B 3/00 138/35 |

(Continued)

FOREIGN PATENT DOCUMENTS

| | | |
|---|---|---|
| EP | 0595656 A1 | 5/1994 |
| EP | 595856 A1 | 5/1994 |
| WO | 0030935 A1 | 6/2000 |

OTHER PUBLICATIONS

CN Office Action dated Apr. 26, 2013 from corresponding CN Application No. 200980163273.5.

(Continued)

*Primary Examiner* — Patrick M Buechner
(74) *Attorney, Agent, or Firm* — Mintz Levin Cohn Ferris Glovsky and Popeo, P.C.

(57) ABSTRACT

A dispensing system is provided for heating a fluid in the dispensing system. A method for heating a fluid in a dispensing system is also provided.

25 Claims, 7 Drawing Sheets

(56) References Cited

U.S. PATENT DOCUMENTS

| | | | |
|---|---|---|---|
| 3,355,572 A * | 11/1967 | Chrow | F16L 53/008 138/139 |
| 3,522,413 A * | 8/1970 | Chrow | B29C 47/0016 137/341 |
| 3,586,245 A | 6/1971 | Carlyon, Jr. | |
| 3,637,136 A | 1/1972 | Bok | |
| 3,727,029 A * | 4/1973 | Chrow | F16L 53/008 137/341 |
| 3,905,405 A | 9/1975 | Fowler et al. | |
| 4,038,519 A * | 7/1977 | Foucras | A61M 1/369 138/133 |
| 4,091,261 A * | 5/1978 | Noland | A01K 7/027 119/73 |
| 4,218,607 A * | 8/1980 | Noland | A01K 7/027 119/73 |
| 4,240,475 A | 12/1980 | Schulz | |
| 4,662,539 A | 5/1987 | Komukai | |
| 4,667,084 A * | 5/1987 | Regge | B05B 7/1633 138/114 |
| 4,964,542 A | 10/1990 | Smith | |
| 5,110,010 A | 5/1992 | Smith | |
| 5,156,199 A | 10/1992 | Hartsell, Jr. et al. | |
| 5,213,142 A | 5/1993 | Koch et al. | |
| 5,782,275 A | 7/1998 | Hartsell, Jr. et al. | |
| 5,988,435 A | 11/1999 | Edwards et al. | |
| 6,032,699 A | 3/2000 | Cochran et al. | |
| 6,149,033 A | 11/2000 | Poleshuk | |
| 6,263,924 B1 | 7/2001 | Grosser | |
| 6,374,868 B1 | 4/2002 | Channing | |
| 6,710,302 B1 | 3/2004 | Rennick | |
| 8,430,429 B2 | 4/2013 | Larsson et al. | |
| 8,733,590 B2 | 5/2014 | Bartlett et al. | |
| 9,038,856 B2 | 5/2015 | Larsson | |
| 9,464,762 B2 | 10/2016 | Mathison | |
| 2003/0007789 A1 * | 1/2003 | Pagnella | F16L 53/008 392/472 |
| 2003/0150507 A1 | 8/2003 | Channing | |
| 2004/0025498 A1 | 2/2004 | Lambert et al. | |
| 2005/0000588 A1 | 1/2005 | Webb et al. | |
| 2005/0056340 A1 | 3/2005 | Walker et al. | |
| 2008/0078782 A1 | 4/2008 | Bien | |
| 2010/0139782 A1 | 6/2010 | Deline et al. | |
| 2010/0209085 A1 | 8/2010 | Ellis et al. | |
| 2011/0126514 A1 | 6/2011 | Brammell | |
| 2012/0024892 A1 | 2/2012 | Bartlett et al. | |
| 2012/0279484 A1 | 11/2012 | Lange | |
| 2015/0298962 A1 * | 10/2015 | Shelton | B67D 7/04 141/82 |
| 2016/0280532 A1 | 9/2016 | McClelland | |

OTHER PUBLICATIONS

Search Report and Written Opinion from corresponding International Application No. PCT/EP2009/064814, dated Sep. 28, 2010.

* cited by examiner

FLUID DISPENSING SYSTEM AND METHOD OF HEATING IN A FLUID DISPENSING SYSTEM

CROSS REFERENCE TO RELATED APPLICATIONS

This application is a continuation of U.S. patent application Ser. No. 14/706,710, filed May 7, 2015, and entitled "Fluid Dispensing Unit Having a Circulation System and a Method for Circulating a Fluid in a Fluid Dispensing Unit," which is a continuation of U.S. patent application Ser. No. 13/508,364, now U.S. Pat. No. 9,038,856, filed on Aug. 27, 2012, entitled "Fluid Dispensing Unit Having a Circulation System and a Method for Circulating a Fluid in a Fluid Dispensing Unit," which is a national stage application under 35 U.S.C. §371(c) of prior-filed, co-pending PCT patent application serial number PCT/EP2009/064814, filed on Nov. 9, 2009, the entire contents of which are incorporated herein by reference in their entireties.

BACKGROUND

Embodiments of the present invention relate to a dispensing unit capable of circulating a fluid and a method for circulating a fluid.

Today, diesel powered vehicles account for large emissions of nitrogen oxides, generally referred to as $NO_x$. The $NO_x$ emissions are harmful to the environment, implying that several techniques are used in order to try to reduce these emissions.

One technique used to reduce the amount of harmful $NO_x$ emissions is selective catalytic reduction (SCR). The basic idea of SCR is to convert $NO_x$ into harmless diatomic nitrogen ($N_2$) and water ($H_2O$). The reaction is enabled using a reductant which is added onto a catalyst. Several reductants may be used such as anhydrous ammonia, aqueous ammonia or urea.

Today a standard is established for using a SCR reductant in diesel powered vehicles. The reductant used is an aqueous urea solution having a urea concentration of 32.5%. The solution is referred to as AUS32. In order to obtain the correct concentration the urea is mixed with demineralized water.

When the diesel engine is running AUS32 is added into the exhaust flow, before or in the catalytic converter, by an amount corresponding to 3-5% of the diesel consumption. When AUS32 is added to the exhaust flow of a diesel engine, the engine can be operated more intensely without generating more NOx emissions.

In Europe AUS32 is generally sold under the trade mark of AdBiue® and in North America the trade name for AUS32 is Diesel Exhaust Fluid or DEF.

AUS32 is commonly available at service stations throughout the world. Various kinds of dispensers are used in order to refill AUS32 in the therefore intended tanks of diesel powered vehicles.

There are however several problems related to the refilling and storing of AUS32. For instance, the AUS32 fluid will easily crystallize when subjected to air i.e. when dried out. This implies that crystals will begin to build up at nozzles and other parts of the dispensers that are not tightly sealed from air. This means in practice that clogging leading to a reduced flow will become a problem.

Another even more severe problem encountered in dispensers for AUS32 is crystallization by freezing of the fluid. The AUS32 fluid will begin to crystallize at −7° C., forming a slush. At −11° C. the fluid will freeze forming a solid. Once the temperature drops below −7° C. it is critical to control the environment of the parts of the dispensers which are subjected to the AUS32 fluid. A common solution used to counteract the fluid from freezing is to place all parts of the dispenser subjected to the fluid in a controlled heated environment. This solution makes the refilling considerably more complicated for the user, since the refilling hose and nozzle must in practice be placed in a heated cabinet or similar. During a refilling process the user must thus open the cabinet before being able to refill the AUS32 tank of his/her vehicle. Once finished the user must close the cabinet in order to not risk that the fluid in the refilling hose will freeze. If the cabinet is not sufficiently closed after a refilling process the fluid in the refilling hose and nozzle might freeze, leaving the dispenser useless for the next user. The use of heated cabinets does also bring about considerable energy consumption, particularly when the cabinet is not sufficiently closed after a refilling process.

AUS32 is also often sold in cans. By providing AUS32 in cans, the fluid can be prevented from freezing during storage, by for example storing the cans in a controlled environment, such as inside a service station. The use of cans filled with AUS32 brings about different problems. The user will for example have to open the can manually and thereafter pour the AUS32 fluid into the therefore intended tank of a vehicle. This means that there is a significant risk of spilling AUS32 during the refilling.

BRIEF SUMMARY

According to an embodiment of the present invention, a dispensing unit having a circulation system-for circulating a fluid in the dispensing unit is provided. The circulation system comprises a circulation circuit, and a mechanism configured to circulate the fluid in the circulation circuit, such that the fluid is counteracted from crystallizing.

According to another embodiment of the present invention, a method for circulating a fluid in a dispensing unit having a circulation system is provided. The method comprises circulating the fluid in a circulation circuit of the circulation system with a pump, such that the fluid is counteracted from crystallizing.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

BRIEF DESCRIPTION OF THE DRAWINGS

Embodiments of the present invention will now be described, by way of example, with reference to the accompanying schematic drawings, given as non-limiting examples, wherein.

DETAILED DESCRIPTION

Embodiments of the present invention provide an improvement of the above techniques and prior art. More particularly, embodiments of the present invention provide a dispensing unit that has a circulation system for counteracting the fluid from crystallizing.

These and other objects as well as advantages that will be apparent from the following description of the present invention are achieved by a dispensing unit and a method for circulating fluid in a dispensing unit according to embodiments of the present invention.

Figure 1:
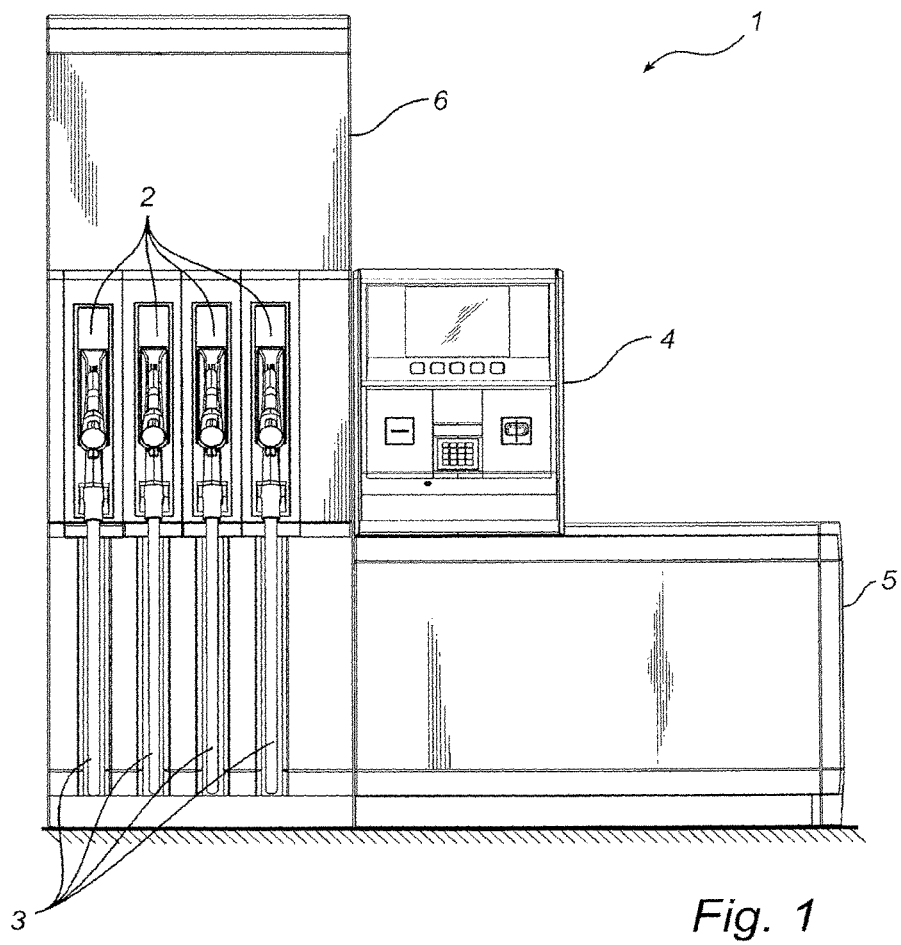
FIG. 1 is schematic front view of a dispensing unit according to an embodiment of the present invention.

FIG. 1 shows a dispensing unit 1, having a plurality of hose storage spaces 2, on each opposing side of the dispensing unit 1. Different refilling hoses 3 are provided for different fluids such as gasoline, diesel and aqueous urea solution (AUS). An electrical cabinet 4 containing electronics for the dispensing unit 1 is provided on top of a hydraulic cabinet 5. The hydraulic cabinet 5 contains fluid dispensing means (not shown) e.g. fluid metering means, valves, piping etc. The plurality of hose storage spaces are arranged in a column 6 extending vertically. The dispensing unit 1 is connected to a plurality of reservoirs (not shown) holding different fluids. The reservoirs holding different fuels, e.g. gasoline or diesel, are normally located underground. The reservoir holding AUS is normally located in the hydraulic cabinet 5, but can also be located underground. When dispensing fluid, the fluid is drawn from one of the reservoirs by means of a pump, located in the hydraulic cabinet 5, and from there to the column 6 and out to a nozzle via one of the refilling hoses 3. When the dispensing unit 1 is not used for dispensing any fluid, all refilling hoses 3 are located in their respective hose storage spaces 2.

Figure 2:
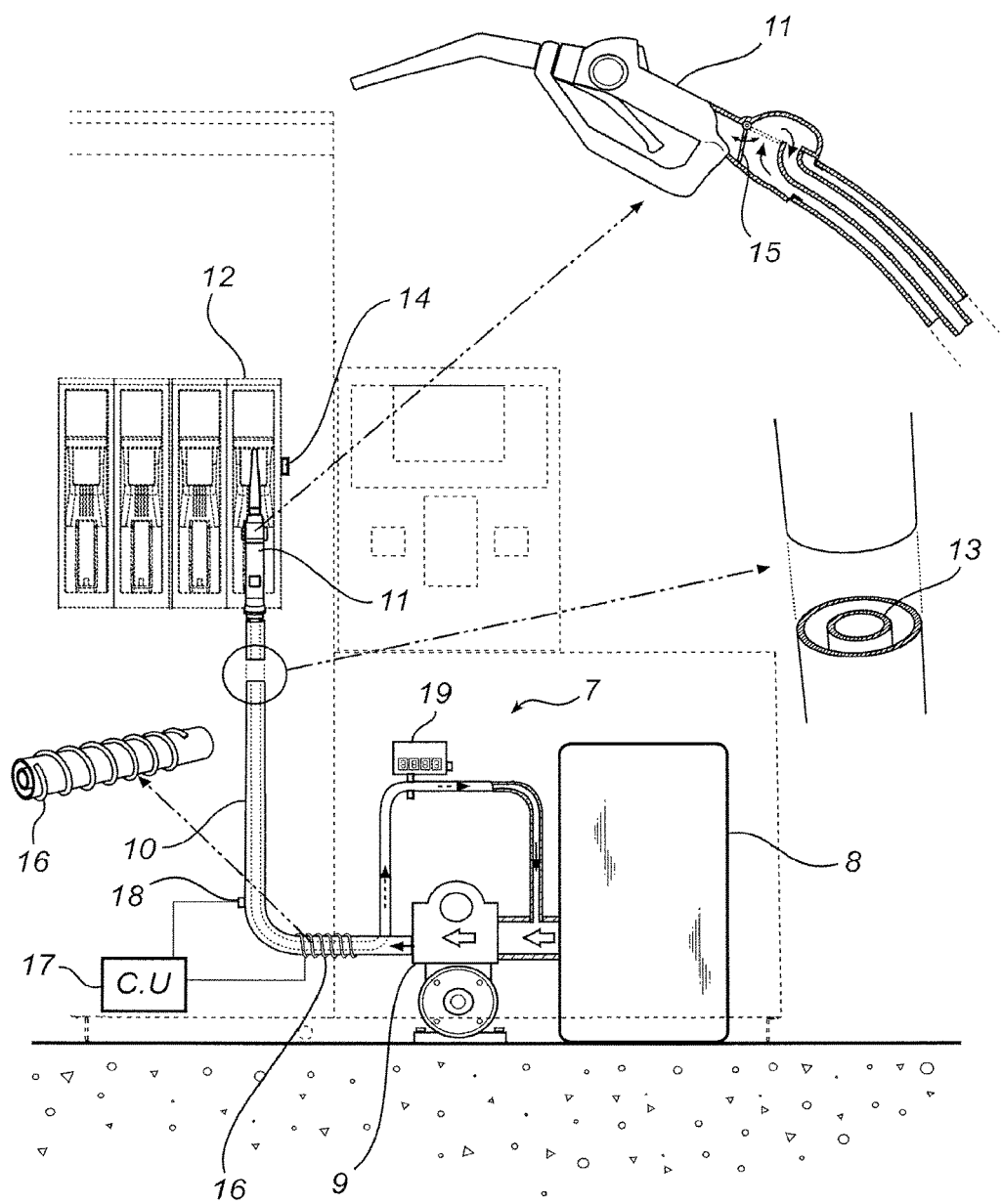
FIG. 2 is a sectional view of a dispensing unit according to an embodiment of the present invention, where the circulation of the fluid is controlled using a valve.

FIG. 2 illustrates parts of the interior of a dispensing unit 1 according to an embodiment of the present invention. The dispensing unit comprises a system 7 for dispensing and circulating AUS. The functionality and construction of the system 7 will now be described more in detail. Systems for dispensing other fluids then AUS are omitted in this description, although present in the dispensing unit 1.

Fluid in form of AUS is stored in a reservoir 8 located in the hydraulic cabinet 5. A pump 9 employed with measurement means (not shown) is used to draw fluid from the reservoir 8 transferring it into a tubing system comprising a hose 10. The hose 10 is used to transfer the fluid to a nozzle 11, which in turn is used for transferring the fluid into a tank of a vehicle, when refilling the tank. The nozzle 11 is placed in a nozzle boot 12 when not used for refilling the tank of a vehicle. A nozzle boot 12 is any means that can receive and/or hold a nozzle 11. The size and shape of the nozzle boot 12 depends on the size and shape of the nozzle 11 in question. Further, the hose has a coaxially installed fluid channel 13 in form of a hose having a smaller diameter. The fluid channel 13 is used to return fluid to the suction side of the pump 9 when the nozzle 11 is not used for refilling the tank of a vehicle and thus placed in the nozzle boot 12. In order to detect whether the nozzle 11 is placed in the nozzle boot 12 or not, a sensor 14 is used. When the sensor 14 detects that the nozzle 11 is properly placed in the nozzle boot 12 the sensor indicates that a circulation of the fluid can be allowed.

In order to perform the circulation of the fluid the valve 15 needs to switched from an open state to a closed state. The wording open state refers to a state where the valve 15 will let any fluid transferred from the pump 9 continue out of the nozzle 11. The wording closed state refers to a state where the valve 15 will lead any fluid transferred from the pump 9 into the fluid channel 13 and thus return the fluid to the suction side of the pump 9, when the pump is started. When the valve 15 is in the closed state, the pump 9 can be started, meaning that fluid will start to circulate form the pump 9, through the hose 10 and back to the pump 9 in the fluid channel 13. In other words, the hose 10 and the fluid channel 13 constitute a circulation circuit. The fluid is thus counteracted from crystallizing.

In order to control the circulation of the fluid in a more sophisticated way, the system 7 of the dispensing unit 1 comprises additional components. A heating element 16 is provided at the hose 10. The heating element 16 is an electrically powered heat cable which is wrapped around the hose 10. Further, the heating element 16 is controlled by a control unit 17, connected to a temperature sensor 18. The temperature of the fluid in the hose 10 is measured by the temperature sensor 18. When the temperature drops below a predefined level, the control unit 17 will activate the heating element 16. The fluid is then circulated during the heating process, meaning that the fluid is counteracted from freezing. Also the pump 9 is controlled by the control unit 17. The power fed to the heating element 16 is controlled by the control unit 17, such that the fluid is maintained at an elevated predefined temperature during the circulation process. In order to counteract the fluid in the reservoir 8 from freezing, the hydraulic cabinet 5 is maintained at an elevated temperature using a separate heating element (not shown).

A flow meter 19 is used during the circulation process in order to detect the amount of the fluid being returned in the fluid channel 13. Since the pump 9 is employed with measurement means the signal from the flow meter 19 can be used to detect leaks during the circulation process. In order to detect leaks, the fluid flow detected by the measurement means of the pump 9 is compared to the fluid flow detected by the flow meter 19. If there is a difference in the measured flows, this is an indication of a leak. Once a leak is detected the circulation of the fluid is stopped. By doing this fluid can be hindered from flowing out in case of a leak.

Figure 3:
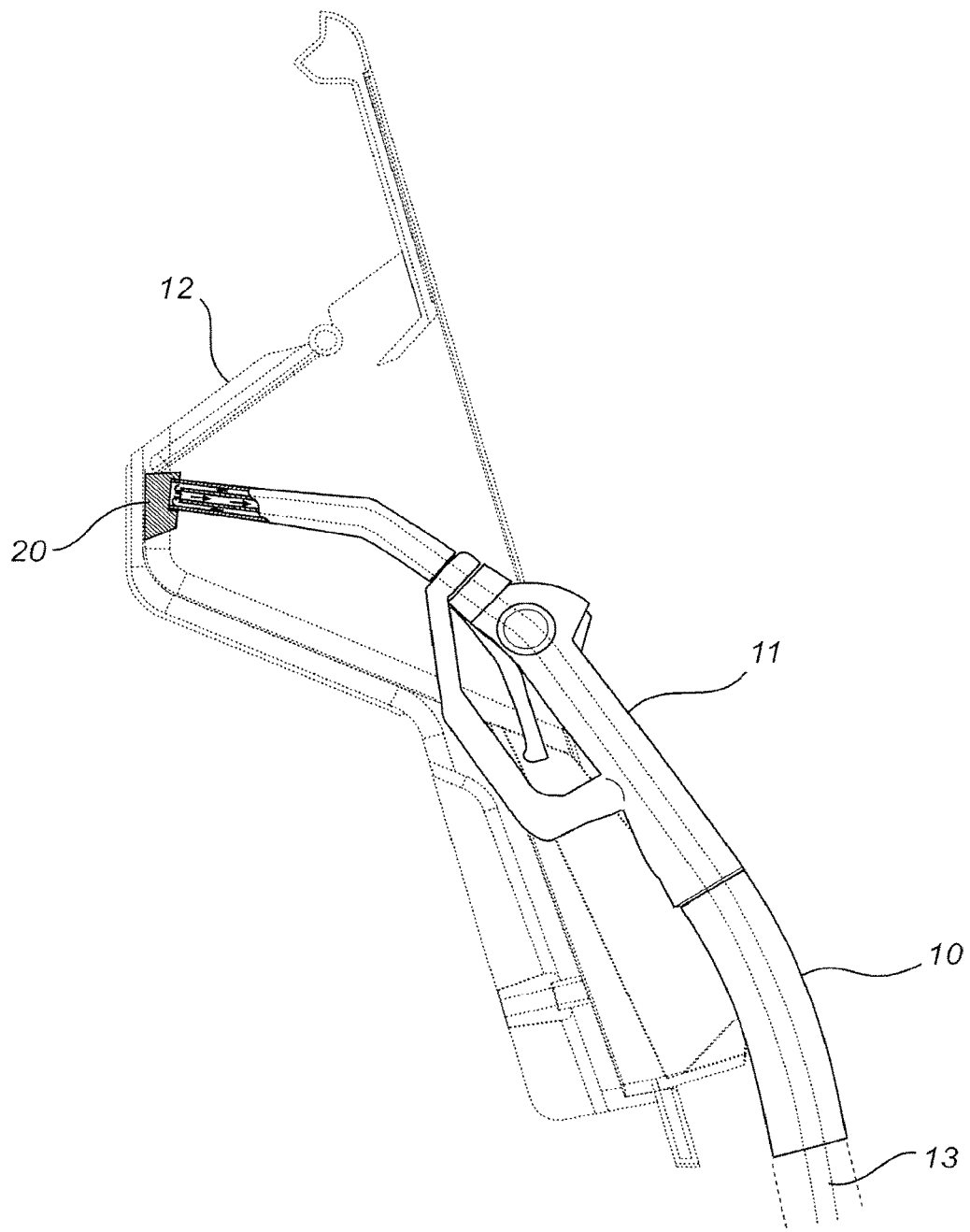
FIG. 3 is a schematic detail view showing an embodiment of the present invention where the circulation of the fluid is controlled by the use of a gauge block.

Now referring to FIG. 3. In order to make the fuel return from the nozzle 11 to the fluid channel 13 a gauge block 20 is placed in the nozzle boot. When the gauge block 20 is used the valve 15 of FIG. 2 is omitted. The gauge block 20 is specifically designed to attain a leak proof fit around the outer periphery of the nozzle 11, enabling fluid communication between the hose 10 and the fluid channel 11. When the pump 9 is operated, fluid will flow from the hose 10, via the nozzle 11 and back into the fluid channel 13 by means of the gauge block 20, meaning that the hose 10 and the fluid channel 13 constitutes a circulation circuit. Also when using a gauge block, a sensor 14 is used to detect that the nozzle 11 is placed in the nozzle boot 12. The circulation process is then carried out in the same way as described above in conjunction with FIG. 2, i.e. when the pump 9 is operated, fluid will flow in the hose 10 and return to the pump 9 in the fluid channel 13 by means of the gauge block 20.

Figure 4:
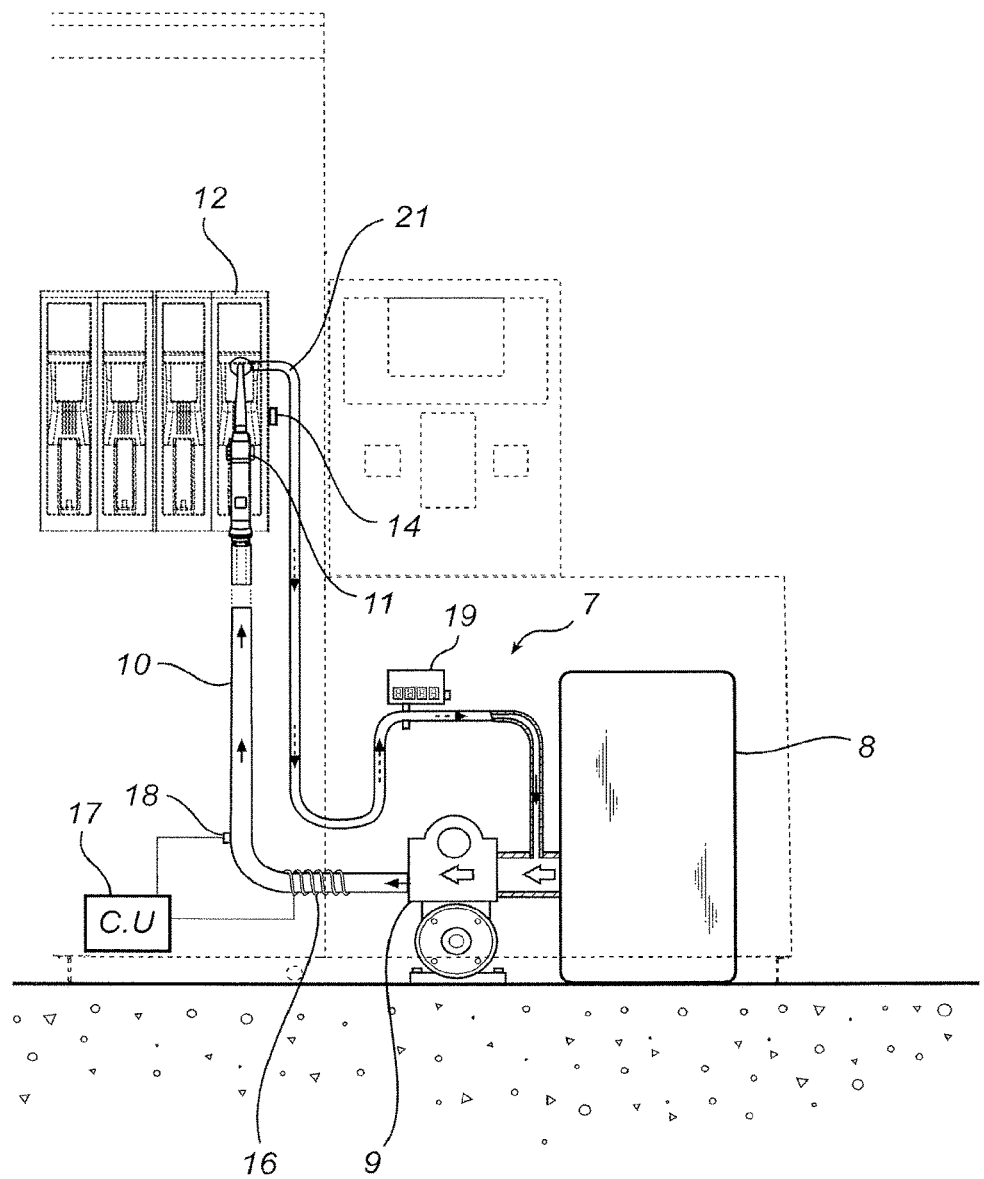
FIG. 4 is a sectional view of a dispensing unit according to an embodiment of the present invention, where the circulation of the fluid is controlled using a return tube.

FIG. 4 illustrates how fluid is lead back to the suction side of the pump 9, using a separate tube 21. The nozzle 11 used in FIG. 4 is specifically designed to attain a leak proof connection with the nozzle boot 12, enabling fuel communication between the hose 10 and the tube 21 via the nozzle boot 12. In this embodiment, the hose 10 and the tube 21 constitutes the circulation circuit. The circulation process is carried out in the same way as described above in conjunction with FIG. 2.

Figure 5:
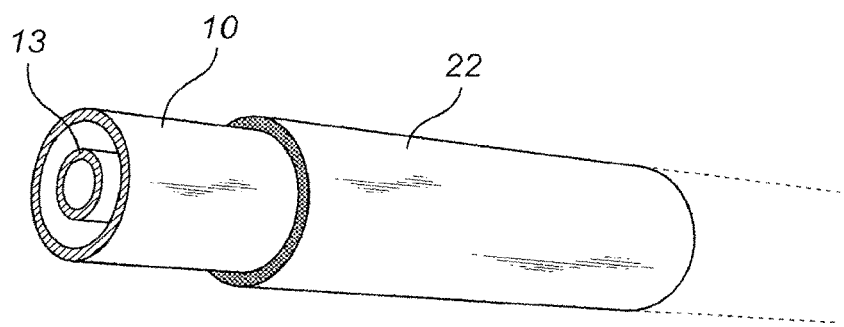
FIG. 5 is a schematic detail view of an insulated hose according to one embodiment of the invention.

FIG. 5 shows a hose 10 according to an alternative embodiment. The hose 10 is covered by an insulation material 22. The purpose for introducing an insulation material 22 is a reduction of energy consumption. The insulated hose will leak less heat to the surrounding, meaning that less power needs to be used in order to maintain the fluid at a predefined temperature.

Figure 6:
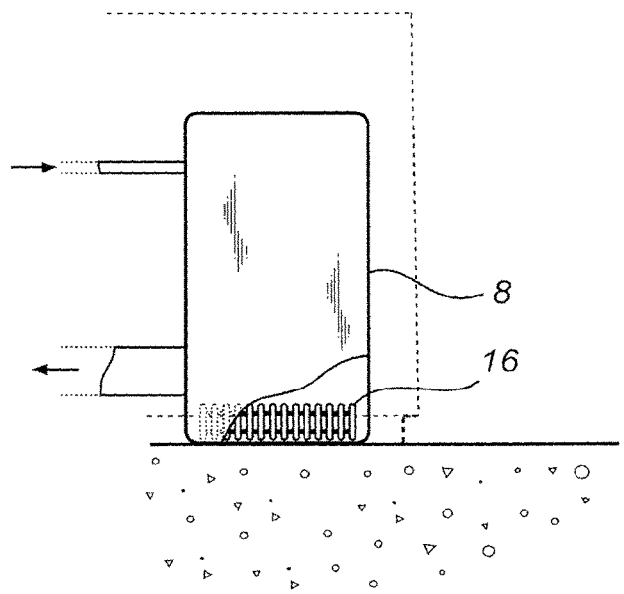
FIG. 6 is a schematic detail view illustrating how a heat cable is arranged in a reservoir according to an embodiment of the present invention.

FIG. 6 shows an alternative embodiment where the heating element 16 is placed in the reservoir 8. By placing the heating element 16 in the reservoir 8, no additional heating may be needed to be applied to the hydraulic cabinet 5. In this embodiment the return of the fluid from the fluid channel 13 or the tube 21 needs to be fed back to the reservoir 8.

Figure 7:
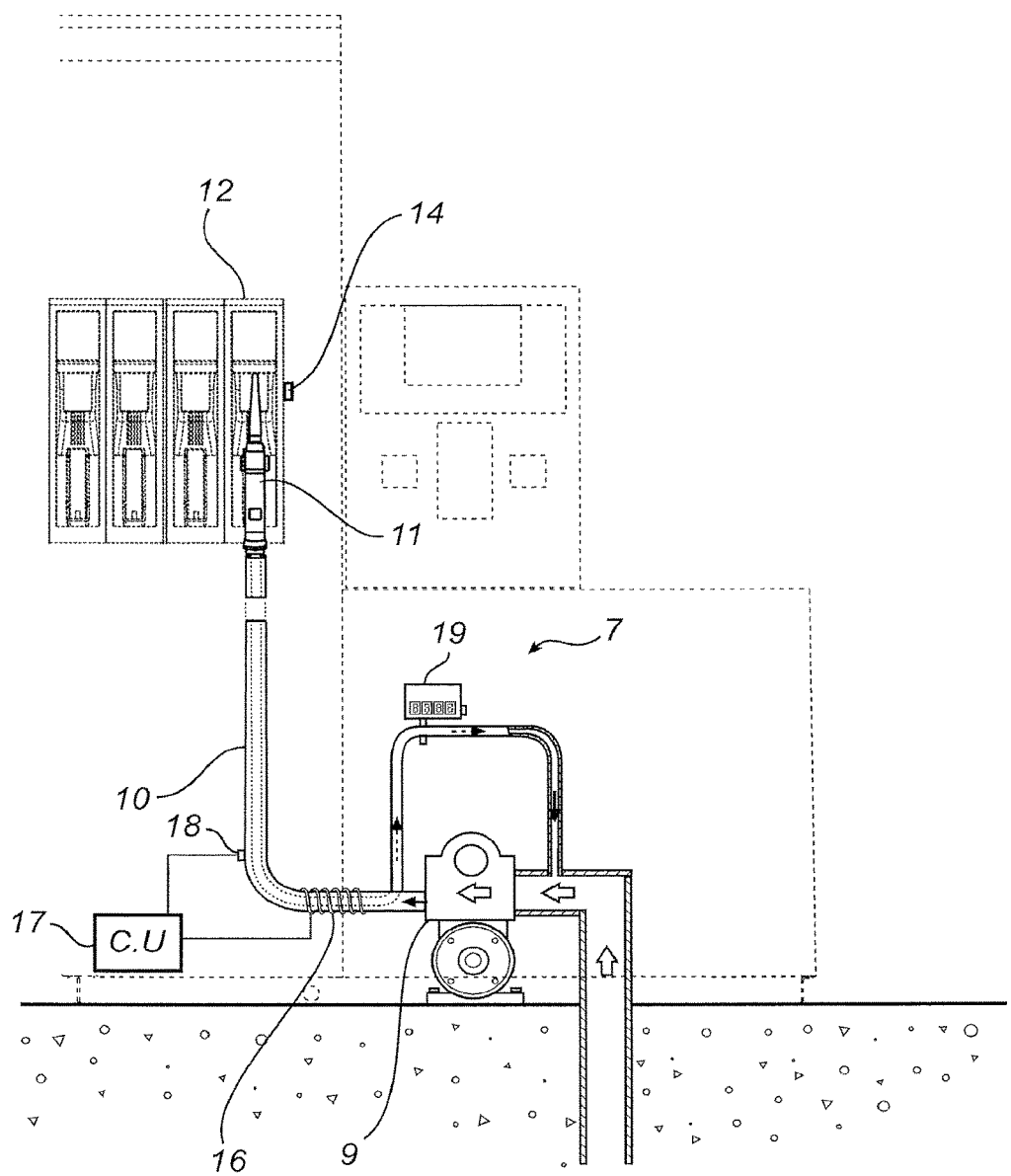
FIG. 7 is a sectional view of a dispensing unit according to an embodiment of the present invention, where fluid is extracted from an underground fluid reservoir.

FIG. 7 illustrates an alternative embodiment where the fluid is stored in an underground reservoir (not shown). By storing the fluid in an underground reservoir the fluid in the reservoir is normally prevented from freezing. Only the fluid circulating in the hose 10 and the fluid channel 13 via the nozzle 11 and the pump 9 needs to be heated and maintained at an elevated temperature in order to be counteracted from freezing.

Figure 8:
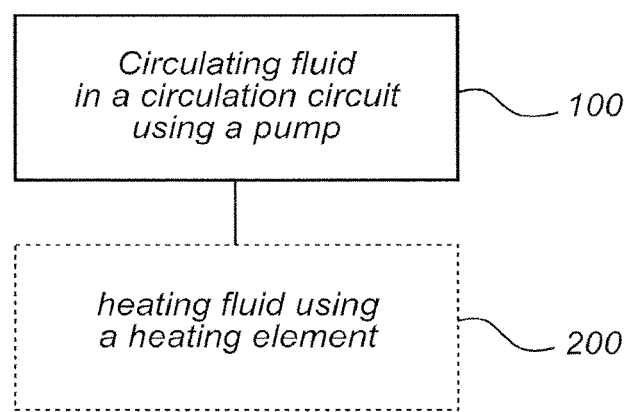
FIG. 8 is a block diagram illustrating a method according to an embodiment of the present invention.

In the following a method according to an embodiment of the present invention will be described. The method is schematically illustrated in FIG. 8. In a first step of the method 100, fluid is circulated in a circulation circuit using a pump.

By circulating the fluid in the circulation circuit, the fluid is counteracted from crystallizing.

In the second optional step 200 of the method in FIG. 8, the fluid is heated using a heating element. By heating the fluid during circulation, the fluid is counteracted from freezing.

A person skilled in the art will realize that a large number of modifications of the here described embodiments of the present invention are conceivable within the scope of the present invention, which is defined in the appended claims.

For example, any fluid can be dispensed using the dispensing unit according to embodiments of the present invention. It is naturally possible to dispense other reductants than AUS, such as anhydrous ammonia or aqueous ammonia.

For instance, the system 7 for dispensing and circulating AUS can be embodied in many different ways, using various components. The hose 10 can at least partly be replaced by a duct arrangement comprising ducts or pipes outside or within the hydraulic cabinet 5, some of which ducts or pipes may be rigid where flexibility is not necessary. These ducts or pipes can be made out of any suitable material, such as metal, plastics, rubber or ceramics.

Several circulation circuits for circulating fluids for different refilling hoses 3 can be used within the same dispensing unit 1. A dispensing unit 1 only having one or several systems for dispensing and circulating AUS can for example be provided. This means that there are no means for dispensing other fluids such as petrol or diesel present in the dispensing unit 1 in this specific embodiment.

The size and shape of the hydraulic cabinet 5 can for example be altered and adapted to be able to hold a reservoir 8 having a different size and shape. For instance, the hydraulic cabinet 5 can be wider for holding a larger reservoir 8, without having to change the design of the dispensing unit 1 significantly.

Any type of pump 9 being capable of dispensing and circulating fluid can be used in the dispensing unit 1. Suitable pump types include displacement, buoyancy, impulse and velocity pumps.

For instance, any type of suitable sensor 14 can be used in order to detect whether the nozzle 11 is placed in the nozzle boot 12 or not. Suitable sensor types include, optical, capacitive, magnetic and hall effect sensors. It is for example also possible to mechanically detect whether the nozzle 11 is placed in the nozzle boot 12 or not. The nozzle 11 can include mechanical switching means which switches the valve 15, when the nozzle 11 is inserted in the nozzle boot 12. This can for instance be carried out by connecting a lever to the valve 15, which lever is pressed upon, when the nozzle 11 is inserted in the nozzle boot 12.

The heating element 16 can for example be any kind of element producing a sufficient amount of heat, for heating the fluid. Various kinds of immersion heaters and electrical radiators can for example be successfully used. Any kind of fuel powered heating element 16 may for example be used to heat the fluid. Further, the heat produced by the heating element 16 may for instance be transferred using heated air or gas. To improve the heat transfer, one or several fans creating a forced flow can for instance be used.

For instance, the heating element 16 can be placed in various positions, in addition to the positions described above. The heating element can be placed within the hose 10, the fluid channel 13, the tube 21 or the pump 9. It is also possible to place the heating element 16 in proximity to any component of the circulation circuit. In other words, it is possible to place the heating element in proximity to or inside any of the components, being used during the circulation process.

For example, the heating element 16 can be controlled using several different strategies. It is possible to switch the power to the heating element 16, meaning that the heating element 16 is operated in intervals. By controlling the timing of the intervals, the mean power fed to the heating element 16 can be controlled. It is for instance also possible to control the voltage fed to the heating element, meaning that the power may be controlled.

The fluid in the reservoir 8 can also be counteracted from freezing when the heating element 16 is placed at the hose 10 as illustrated in FIG. 2 or 4. In order to achieve the desired anti-freeze effect in this case, the fluid channel 13 or tube 21 need to be fed back to the reservoir 8 as described above in conjunction with FIG. 6.

It is also possible to lead the fluid from fluid channel 13 or the tube 21 directly back to an underground reservoir. Also, the use of an underground reservoir can naturally be employed to the embodiments of the present invention, for example, as shown in FIGS. 2, 3 and 4.

Also, the temperature sensor 18 can be placed at any suitable location, where it is possible the measure the temperature of the fluid. This means that the temperature sensor can be placed in proximity to or inside any of the parts that are in contact with the fluid during the circulation process.

For instance, it is possible to use various types of flow meters 19, to measure the flow in the fluid channel 13 or the tube 21. The flow meters 19 include mechanical, pressure based, optical, thermal mass, vortex, coriolis, magnetic and ultrasonic flow meters.

For example, the gauge block 20 can be crafted in various shapes using different materials.

The circulation process can for example be carried out using different strategies. The circulation process can be performed continuously when the dispensing unit 1 is not used to fill the tank of a vehicle. It is also possible to run the circulation process at predefined intervals, or intervals depending on outer conditions, such as temperature, humidity and wind speed. Another approach is to use measure the time since the last use of the dispensing unit 1 and initiate the circulation process if the time exceeds a predefined time limit. Also the time limit can be adapted with respect to outer conditions.

The return tube 21 can for example be made out of any suitable material, such as metals, plastics or ceramics.

Further, the nozzle 11 and nozzle boot 12 used in combination with the tube 21 can for example be employed with self closing valves, meaning that a spill free system is obtained. In other words, valves in the nozzle 11 and nozzle boot 12 will close once the nozzle 11 is removed from the nozzle boot, meaning that no spill will occur at the nozzle 11 or nozzle boot 12.

For instance, the insulation material 22 may be made of any suitable material, such as glass wool, rock wool, fibre glass, cellular plastic or EPDM foam.

According to an embodiment of the present invention, a dispensing unit is provided. The dispensing unit comprises a circulation system for circulating a fluid in the dispensing unit. The circulation system comprises a circulation circuit and means for circulating the fluid in the circulation circuit, such that said fluid is counteracted from crystallizing.

The dispensing unit according to an embodiment of the present invention may circulate the fluid in the dispensing unit, meaning that crystallization of the fluid is counteracted. This in turn means that the user will not encounter any or at least reduced problems with contaminated or clogged nozzles. Further, the risk of a reduced flow, due to clogging, from the dispenser is eliminated.

In one embodiment, the circulation system of the dispensing unit may comprise a heating element for heating the fluid, which the fluid is counteracted from freezing.

The circulation circuit of the dispensing unit may comprise a hose having a coaxially installed fluid channel. This means that the fluid can be circulated in the hose and the coaxially installed fluid channel using a standard hose arrangement.

The circulation system may further comprise a valve controlling the fluid when circulating through the hose and the fluid channel, thus the circulation of the fluid can be controlled by switching the valve.

The circulation system may further comprise a gauge block controlling said fluid when circulating through said hose and said fluid channel, which results in that the circulation in the hose and the fluid channel can be performed in a simple and effective manner.

The circulation system may comprise a hose having a nozzle and a nozzle boot, so the nozzle can be placed in the nozzle boot when circulating the fluid.

The nozzle of the dispensing unit may be adapted to attain a leak proof connection for fluid communication with the nozzle boot, when inserted in the nozzle boot. This is a simple way of achieving a leak proof fluid communication between the nozzle and the nozzle boot.

The circulation circuit may further comprise a tube connected to the nozzle boot, so fluid can be circulated through the nozzle boot and the tube.

The circulation system may further comprises a reservoir adapted to hold the fluid, the reservoir may be connected to the circulation circuit, so fluid can be extracted from the reservoir and returned to the reservoir after being circulated.

The heating element may be located in the circulation system, which results in that the fluid can be heated during circulation. This means that the fluid easily can be heated and/or maintained at an elevated temperature during circulation.

The heating element may be located in the reservoir, so the fluid in the reservoir can be heated, which brings about that a fluid having an elevated temperature may be circulated in the circulation system.

The heating element may comprise a heat cable, which results in that the fluid can be heated in a simple and cost effective way, using standard components.

The means for circulating the fluid of the dispensing unit may comprise a pump, so the fluid can be effectively circulated using a cost effective standard solution.

The circulation system may further comprise a temperature sensor connected to a control unit controlling the means for circulating the fluid, so the fluid may only be circulated under certain temperature conditions.

The control unit may further control the heating element, which results in that the fluid may only be heated under certain temperature conditions.

The circulation system of the dispensing unit may further comprise means for measuring the amount of circulated fluid, so leaks and other operational disturbances can be easily detected.

The fluid of the dispensing unit may be aqueous urea solution, which results in that the dispensing unit can be utilized for refilling vehicles having a tank dedicated for aqueous urea solution.

At least a portion of the circulation system may be insulated, so the energy consumption can be significantly reduced when heating the fluid.

According to an embodiment of the present invention, a method is provided for circulating a fluid in a dispensing unit having a circulation system. The method comprises circulating the fluid in a circulation circuit of the circulation system by means of a pump. By doing this the fluid can be counteracted from crystallizing.

The method may further comprise the step of heating the fluid by means of a heating element in the circulation system, so the fluid can be heated and/or maintained at an elevated temperature.

It should be noted that the method may incorporate any of the features described above in association with the dispensing unit according to embodiments of the present invention, and has the same advantages.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fuel dispensing system, comprising:
    a coaxial hose having first and second passageways therein, the second passageway being configured to deliver fuel to the first passageway;
    a nozzle at a distal end of the hose, the nozzle being configured to receive the fuel from the first passageway of the coaxial hose, and the nozzle being configured to dispense the fuel therefrom; and
    a heating element coupled to the coaxial hose and configured to provide heat within the coaxial hose that heats the fuel within the coaxial hose.

2. The system of claim 1, wherein the first passageway is surrounded by the second passageway, each of the inner and outer passageways configured to have the fuel flow therein.

3. The system of claim 1, wherein the heating element extends along at least a partial longitudinal length of the coaxial hose.

4. The system of claim 1, wherein the heating element is located entirely proximal to a proximal end of the coaxial hose.

5. The system of claim 1, wherein the heating element includes a heat cable.

6. The system of claim 1, further comprising a sensor configured to sense a temperature; and
    a control unit configured to alternately activate and deactivate the heating element based on the temperature sensed by the sensor.

7. The system of claim 1, wherein the first passageway is configured to flow the fuel therethrough in a first direction, and the second passageway is configured to flow the fuel therethrough in a second, opposite direction.

8. The system of claim 1, wherein the coaxial hose includes a first hose coaxially disposed within a second hose, the first hose defining the first passageway and the second hose defining the second passageway.

9. The system of claim 8, wherein one of the first and second hoses has a distal end that is proximal to a distal end of the other of the first and second hoses.

10. The system of claim 8, wherein the second hose has an open distal end.

11. The system of claim 8, wherein the first hose has an open distal end.

12. The system of claim 8, wherein the first and second hoses each have an open distal end.

13. A fuel dispensing system, comprising:
    a hose that includes a first tubular member having a first lumen and a second tubular member having a second lumen, the second tubular member being coaxial with the first tubular member, the first and second lumens being in communication with one another, and the first lumen being adjacent to the second lumen along at least a partial longitudinal length thereof;
    a fuel dispensing nozzle at a distal end of the hose; and
    a heating element configured to heat the fuel flowing in the first lumen such that the heated fuel flows from the first lumen into the second lumen.

14. The system of claim 13, wherein one of the first and second tubular members has a distal end that is proximal to a distal end of the other of the first and second tubular members.

15. The system of claim 13, wherein the second tubular member has an open distal end.

16. The system of claim 13, wherein the first tubular member has an open distal end.

17. The system of claim 13, wherein the first and second tubular members each have an open distal end.

18. The system of claim 13, wherein the heating element extends along at least a partial longitudinal length of the first tubular member.

19. The system of claim 13, wherein the heating element is coupled to the first tubular member in a proximal portion thereof.

20. The system of claim 13, wherein the heating element is located entirely proximal to a proximal end of the first tubular member.

21. The system of claim 13, wherein the heating element includes a heat cable.

22. The system of claim 13, further comprising a sensor configured to sense a temperature; and
    a control unit configured to alternately activate and deactivate the heating element based on the temperature sensed by the sensor.

23. A method of heating in a fuel dispensing system, comprising:
    activating a heating element to provide heat within a first passageway of a hose of a fuel dispensing system that includes a fuel dispensing nozzle attached to a distal end of the hose, thereby also heating fuel flowing in a first direction in a second passageway of the hose, the first passageway having the fuel flowing in a second, opposite direction therethrough, the first and second passageways being coaxial and being longitudinally adjacent to one another along at least partial longitudinal lengths thereof.

24. The method of claim 23, further comprising sensing a temperature using a sensor, wherein the heating element is activated in response to the sensed temperature being below a predefined temperature.

25. The method of claim 24, further comprising sensing a second, subsequent temperature using the sensor; and
    deactivating the heating element in response to the sensed second temperature being above the predefined temperature.

* * * * *